United States Patent Office 2,988,448
Patented June 13, 1961

2,988,448
FEEDSTUFFS AND SYNERGISTIC ENZYMATIC ADDITIVE THEREFOR
Clifford M. Hollenbeck, Manitowoc, Wis., assignor to Wisconsin Malting Co., Milwaukee, Wis., a corporation of Wisconsin
No Drawing. Filed Oct. 6, 1958, Ser. No. 765,276
10 Claims. (Cl. 99—2)

This invention relates to up-grading feeds through the addition of enzymes and particularly to the up-grading of fibrous grain feeds through the addition of cytolytic enzymes. While the following description is directed primarily to barley used as poultry feed, it will be appreciated this invention is applicable to other fibrous grain feeds and may be used other than as poultry feed.

The most common grain feed for poultry is corn. Since corn is highly efficient in metabolizable energy it generally represents the basic carbohydrate source in poultry feeds. There are certain areas in the United States and other countries where corn, for one reason or another, is not a major field crop and if it is used as the basic carbohydrate source in feedstuffs, the cost is correspondingly high. In many of these high cost corn areas, barley is plentiful and correspondingly relatively less costly than corn. It has been attractive to the feed industry, especially the poultry feed industry, in these areas to utilize barley as much as possible in their feed formulas. Barley, however, does not give as good a feed efficiency in poultry as corn. For example, the metabolizable energy values of these grains are as follows (Morrison, Feeds and Feeding, 22nd edition, pg. 1146):

Calories per pound
Corn _____ 1,550
Barley _____ 1,320

Based on the average composition of barley the metabolizable energy or barley should be about 1,500 calories per pound and thus, nearer to that of corn. There have been explanations for the lower feeding efficiency for barley such as interference in digestion by the fibrous hulls etc., but none of these explanations have proven conclusive. Recent studies have shown that the value of barley is improved in terms of feed efficiency or metabolizable energy for poultry, if it is first steeped in water or supplemented with enzymes. This work was performed and announced by investigators at Washington State College in April 1957 (references: Feedstuffs, 29, April 20, pg. 1, 1957; Jensen et al., Proc. Soc. Exp. Biol. and Med. 95, June, pg. 249, 1957; Poultry Science 36, July, pg. 919, 1957; Feedstuffs, 29, October 5, pg. 28, 1957).

Hastings (Poultry Science 25, pg. 584, 1946) found earlier that the addition of a diastatic enzyme material (mold bran) to a high fiber containing chicken feed including milling by-products, improved growth and feed efficiency. The enzymatic material did not improve feeds with relatively low fiber content.

In all of the investigations for up-grading the value of barley or other fibrous grain materials in poultry feed by the use of enzymes, the enzymes used have been derived from the growth of molds or bacteria. For example, Jensen et al. used an enzyme preparation known as Clarase or Takadiastase derived from the growth of mold. Hastings also used a crude product derived by growth of molds on steamed wheat bran. McGinnis disclosed the use of an alpha-amylase product derived from a bacterial fermentation. Furthermore, McGinnis states "Here it was found that only Clarase and alpha-amylase (bacterial origin) were effective in promoting growth and feed efficiency. Pancreatin and malt diastase were inactive." (Feedstuffs 29, pg. 28 (Oct. 5), 1957.)

Earlier I found that diastatic barley malt was effective as an enzyme supplement in up-grading the value of barley for poultry feed (U.S. patent application, Serial No. 700,552). Now I have found that a combination of barley malt with enzyme preparations derived from the growth of fungi are much more effective than enzymes from either source acting singly. Accordingly, the novelty of my invention is the discovery that diastatic barley malt and fungal enzyme preparations act synergistically in increasing the value of barley and other fibrous grains in poultry feed.

An example of the synergistic effect of the combination of malt enzymes and fungal derived enzymes in increasing the growth rate of chickens on rations containing barley is given in Table I.

TABLE I

Comparison of chick weights after being fed barley based rations supplemented with various enzymes and combinations thereof

| Test No. | Supplementary Enzyme | Relative Enzyme Potency of Supplement (Alpha-Amylase Units) | Average Weight of Chicks (grams) (20 chicks per group) | |
|---|---|---|---|---|
| | | | 4 Weeks | 10 Weeks |
| 1 | Control (no enzyme) | | 292 | 1,195 |
| 2 | Malt | 50 | 319 | 1,263 |
| 3 | Fungal Preparation (crude) | 194 | 334 | 1,308 |
| 4 | Malt plus Fungal preparation (crude) | 140 | 363 | 1,370 |
| 5 | Malt plus Fungal preparation (purified) | 194 | 348 | 1,434 |

The barley based ration comprised 40% basal mixture of alfalfa leaf meal, soya bean meal, bone meal, granite grits, limestone, iodized salt, fish meal and a vitamin mineral mixture and 60% barley plus enzyme supplement. The enzyme supplement amounted to about 1.5% by weight of the barley based ration, with the exception of the malt alone, which was 4% by weight of the barley based ration.

The fungal enzyme supplementary preparation used in the above tests was "mold bran" or a dried material resulting from the growth of *Aspergillus oryzae* on steamed wheat bran.

In test No. 4 the ground mold bran was mixed with an equal weight of ground, diastatic malt.

In test No. 5 the fungal material was a purified preparation sold by the Rohm and Haas Company of Philadelphia, Pennsylvania, under the name of Rhozme S. The funcal enzyme preparation was added to ground, diastatic malt at the level of 5% of the enzyme mixture.

The method used for analyzing the alpha-amylase units is described on page 34 of Cereal Laboratory Methods, sixth edition.

The growth rate of the chicks, as illustrated by the average weights at 4 weeks and at 10 weeks in Table I, is appreciably faster when a combination of malt and fungal enzymes is used. This synergistic effect of the two types of enzymes on the growth of the chickens is especially demonstrated when it is noted that the relative enzyme levels, using alpha amylase as the index, for the malt by itself and for the mold bran by itself are as high or higher than for the combination, yet the combination gives better growth response.

The results from a second series of chick feeding tests, shown in Table II, confirm further the synergistic effect of the two types of enzymes on improving the value of barley for chickens. The feeding test in this second series was very similar to the first in terms of make-up of the ration and numbers of chicks per group. The chick growth data at the end of 4 weeks show that a combination of the two types of enzymes at half-levels is more effective than either enzyme at full levels. It is apparent that a rather small amount of fungal enzyme seems to enhance the activity of malt out of proportion to the measurable additive enzyme effect.

TABLE II

Chick weights on barley based rations supplemented with enzymes

| Enzyme Level (Percent Ration) | | Average Weight of Chicks (grams)— 4 Weeks |
|---|---|---|
| Malt | Clarase [1] | |
| 0 | 0 | 366 |
| 2.5 | 0 | 379 |
| 0 | 0.12 | 390 |
| 1.25 | 0.06 | 413 |
| 2.5 | 0.03 | 385 |

[1] Fungal enzyme preparation, Takamine Laboratories, Clifton, New Jersey.

The mechanism of the action of enzymes in up-grading barley in poultry feed is not known. However, it is well known that barley contains non-starch carbohydrate material known as beta-polyglucosides and/or polypentosides and commonly referred to as gums. It is also known that the usual digestive enzymes do not attack these gums and degrade them into metabolizable sugars. The cytases of malt and other enzyme sources, however, react with the barley gums and cleave them into sugars which are metabolizable. The degradation of the barley gums to sugars and thereby increasing the metabolizable energy values could, therefore, be the mechanism of the enzyme effect on barley in poultry feeds.

The mechanism of the synergism between malt enzymes and fungal produced enzymes in improving the growth of poultry on rations containing barley and other similar grains is likewise not known. It can be visualized, however, that possibly the cytolytic enzymes of the two types react best under slightly different conditions of temperature, pH, substrate susceptibility, etc., and these conditions change from the optimum for one type to the optimum for the other type during the course of enzyme action.

Another possible mechanism would be that one type of enzyme uses as its substrate the end products derived from the reaction of the other type of enzyme and the barley components. If the mechanism of improving the substrate for a given enzyme action by the prior action of another enzyme accounts for the synergism, it is quite likely that enzyme from sources other than fungi, such as those produced by bacteria and/or yeast, would also act synergistically with either malt or fungal enzymes, or both.

The tests to date indicate the range of usage is between 1% and 3% of the feed which is about 2% to 5% of the grain component of the feed. Previous tests (as set out in my application Serial Number 700,552) indicate the range for malt alone runs between 0.5% and 5% of the feed or about 1 to 8% of the grain component and there is good reason to believe this range applies in the present situation, particularly since the ratio of malt to fungal enzymes is subject to much variation while still gaining the advantages of the synergistic effect.

It should also be understood that this invention applies to the improvement of feedstuffs containing gum-like substances for animals as well as poultry. In other words, whenever a feed or food can be improved in increased metabolizable energy from degradation of non-starch carbohydrate constituents by enzymes, the process falls within the scope of this invention.

Further study in this field may demonstrate various changes or deviations from the above are practical and for this reason this invention is to be limited only by the scope of the claims.

I claim:

1. A fibrous grain feed containing a combination of malt and fungal enzymes in a proportion to give a synergistic growth effect.

2. A fibrous grain feed containing 1 to 8%, based on the grain component of the feed, of a combination of malt with enzymes from fungal sources in a proportion to give a synergistic growth effect.

3. A poultry feed containing barley and a combination of malt and fungal enzymes in a proportion to give a synergistic growth effect.

4. A poultry feed containing barley and 1 to 8%, based on the grain component of the feed, of a combination of enzymes from malt and fungal sources in a proportion to give a synergistic growth effect.

5. A fibrous grain feed containing 1 to 5%, based on the grain component of the feed, of a combination of malt with enzymes from fungal sources in a proportion to give a synergistic growth effect.

6. A poultry feed containing barley and 1 to 5%, based on the grain component of the feed, of a combination of enzymes from malt and fungal sources in a proportion to give a synergistic growth effect.

7. A feed additive comprising a combination of malt and fungal enzymes in a proportion to give a synergistic growth effect.

8. A feed additive comprising a combination of enzymes from malt and fungal sources in a proportion to give a synergistic growth effect.

9. A feed additive comprising a mixture of malt with enzymes from fungal sources in a proportion to give a synergistic growth effect.

10. A fibrous grain feed containing up to about 5%, based on the grain component of the feed, of a combination of malt with enzymes from fungal sources in a proportion to give a synergistic growth effect.

References Cited in the file of this patent

Feedstuffs, May 3, 1958, page 4.
Poultry Science 37, March 1958, pages 372–375.
Hastings, Poultry Science 25 (1946), pages 584–586.